United States Patent
Marcourt et al.

(10) Patent No.: US 11,023,578 B2
(45) Date of Patent: Jun. 1, 2021

(54) METHOD AND ELECTRONIC DEVICE FOR MONITORING AN AVIONICS SOFTWARE APPLICATION, RELATED COMPUTER PROGRAM AND AVIONICS SYSTEM

(71) Applicant: THALES, Courbevoie (FR)

(72) Inventors: Michael Marcourt, Valence (FR); Stéphane Jean-Mary Monnier, Merignac (FR); Marc Etienne Fumey, Toulouse (FR)

(73) Assignee: THALES, Courbevoie (FR)

( * ) Notice: Subject to any disclaimer, the term of this patent is extended or adjusted under 35 U.S.C. 154(b) by 248 days.

(21) Appl. No.: 15/970,151

(22) Filed: May 3, 2018

(65) Prior Publication Data

US 2018/0322282 A1   Nov. 8, 2018

(30) Foreign Application Priority Data

May 4, 2017   (FR) ...................................... 17 00479

(51) Int. Cl.
  *G06F 21/55*   (2013.01)
  *H04L 29/06*   (2006.01)
  (Continued)

(52) U.S. Cl.
  CPC ........... *G06F 21/554* (2013.01); *B64D 45/00* (2013.01); *G06F 21/55* (2013.01); *G06F 21/556* (2013.01);
  (Continued)

(58) Field of Classification Search
  CPC ....... H04L 9/00; H04L 63/1408; H04L 67/12; G06F 21/00; G06F 21/554; G06F 21/556; G06F 21/577; G08G 5/0021; B64D 45/00
  See application file for complete search history.

(56) References Cited

U.S. PATENT DOCUMENTS

| | | |
|---|---|---|
| 6,275,767 B1 | 8/2001 | Delseny et al. |
| 6,735,703 B1 | 5/2004 | Kilpatrick et al. |
| (Continued) | | |

FOREIGN PATENT DOCUMENTS

| | | |
|---|---|---|
| EP | 1 296 252 | 3/2003 |
| EP | 2 987 729 | 2/2016 |
| FR | 2818769 | 6/2002 |

OTHER PUBLICATIONS

French Search Report, Application No. 1700479, dated Jan. 9, 2018.

*Primary Examiner* — Joseph P Hirl
*Assistant Examiner* — Leynna Truvan
(74) *Attorney, Agent, or Firm* — Nixon & Vanderhye (57) ABSTRACT

Disclosed is method for monitoring an avionics software application, able to be executed on a platform including resources and hosting an operating system, the platform being intended to be on board an aircraft, implemented by an electronic monitoring device. The method includes: implementing at least one monitoring operation of the application from among syntactic monitoring of each call emitted by the application to the operating system; semantic monitoring of each call emitted by the application to the operating system; monitoring of a dynamic of the calls emitted by the application to the operating system; and monitoring of the use by the application of the resources of the platform; and generating an alarm signal if an abnormal behavior of the application is detected.

10 Claims, 1 Drawing Sheet

(51) Int. Cl.
*G08G 5/00* (2006.01)
*H04L 29/08* (2006.01)
*B64D 45/00* (2006.01)
*G06F 21/57* (2013.01)

(52) U.S. Cl.
CPC ......... *G06F 21/577* (2013.01); *G08G 5/0021* (2013.01); *H04L 63/0227* (2013.01); *H04L 63/1408* (2013.01); *H04L 67/12* (2013.01)

(56) References Cited

U.S. PATENT DOCUMENTS

| | | |
|---|---|---|
| 10,202,190 B2 * | 2/2019 | Tao .................. G05D 1/0022 |
| 2002/0120662 A1 | 8/2002 | Goiffon |
| 2016/0275289 A1 * | 9/2016 | Sethumadhavan ..... G06F 21/52 |

* cited by examiner

METHOD AND ELECTRONIC DEVICE FOR MONITORING AN AVIONICS SOFTWARE APPLICATION, RELATED COMPUTER PROGRAM AND AVIONICS SYSTEM

CROSS-REFERENCE TO RELATED APPLICATIONS

This application is a U.S. non-provisional application claiming the benefit of French Application No. 17 00479, filed on May 4, 2017, which is incorporated herein by reference in its entirety.

FIELD

The present invention relates to a method for monitoring an avionics software application, able to be executed on a platform including resources and hosting an operating system, the platform being intended to be on board an aircraft, the method being implemented by an electronic monitoring device.

The invention also relates to a non-transitory computer-readable medium including a computer program including software instructions which, when executed by a computer, implement such a method.

The invention also relates to an electronic device for monitoring an avionics software application, able to be executed on a platform including resources and hosting an operating system, the platform being intended to be on board an aircraft.

The invention also relates to an electronic avionics system comprising a memory able to store at least one avionics software application; a platform able to execute each avionics software application, the platform including resources and hosting an operating system; and such an electronic monitoring device for monitoring each avionics software application.

The invention relates to the field of the cyber security of on board avionics platforms, in particular the monitoring of software applications executed on such on board avionics platforms.

BACKGROUND

Document EP 2,987,729 A1 teaches a method for determining an intrusion in an avionics system or component on board an aircraft. The aircraft includes many avionics systems and components communicating with one another via an avionics communication network, the avionics network being monitored by a dedicated system.

This determination method comprises the monitoring, by said dedicated system, of data communications via said avionics network for several avionics systems or components. The method next comprises the comparison, by said dedicated system, of the monitored communications for at least one avionics system or component with a corresponding operational profile, and the determination of an intrusion for said avionics system or component, when the comparison indicates that an intrusion profile is satisfied.

The method then comprises generating an alarm associated with the determined intrusion.

However, such an associated determination method and system do not make it possible to detect certain targeted attacks.

SUMMARY

The aim of the invention is then to propose a method and device for monitoring an avionics software application able to be executed on an avionics platform, which allows more effective detection of an attack targeting the software application.

To that end, the invention relates to a method for monitoring an avionics software application, able to be executed on a platform including resources and hosting an operating system, the platform being intended to be on board an aircraft, the method being implemented by an electronic monitoring device and comprising:
- implementing at least one monitoring operation of the application from among the following four monitoring operations:
  - syntactic monitoring of each call emitted by the application to the operating system,
  - semantic monitoring of each call emitted by the application to the operating system,
  - monitoring of a dynamic of the calls emitted by the application to the operating system, and
  - monitoring of the use of platform resources by the application;
- generating an alarm signal if an abnormal behavior of the application is detected during the implementation of at least one of said monitoring operations.

With the monitoring method according to the invention, the implementation of at least one, preferably at least two, more preferably at least three, and still more preferably each, of the monitoring operations from among the syntactic monitoring, semantic monitoring, monitoring of the dynamics and monitoring of the use allows a precise definition, i.e., characterization of a usage domain of the application, also called cyber usage domain. The monitoring method is then able to generate an alarm signal if an abnormal behavior of the application is detected, i.e., if it departs from the characterized usage domain.

The characterization of the usage domain is predefined, and done before the monitoring of the avionics application, for example during a mission preparation phase.

The monitoring method according to the invention then allows in-depth protection of the application, as opposed to a peripheral protection, through monitoring of the avionics network, of the state of the art.

According to other advantageous aspects of the invention, the monitoring method comprises one or more of the following features, considered alone or according to all technically possible combinations:
- the syntactic monitoring includes verifying at least one of first, second and third syntactic criteria,
  - the first syntactic criterion being the belonging of each emitted call to a list of authorized calls to the operating system,
  - the second syntactic criterion being the compliance of the series of calls with authorized call sequences,
  - the third syntactic criterion being the compliance of each datum relative to a predefined corresponding format;
- the semantic monitoring includes verifying that at least one of first, second and third semantic criteria is met by one or more data contained in each call from the application to the operating system,
  - the first semantic criterion being the belonging to a predefined interval of values of the update time frame for each datum,
  - the second semantic criterion being a coherence criterion for at least one predefined datum, such as a position or a speed of the aircraft, and the third semantic criterion being a coherence criterion between at least two predefined data, such as the position or the speed of the aircraft;

the operating system is able to offer several services of different types to the application, and the monitoring of the dynamics includes verifying that at least one of first, second, third, fourth and fifth dynamics criteria is met by the application, the first dynamics criterion being that the number of services required by the application is, during a period of time with a predefined duration, below a predefined maximum number of services per unit of time, the second dynamics criterion being that a number of errors on the services is, during a period of time with a predefined duration, below a predefined maximum number of errors, the third dynamics criterion being that the number of different types of services required by the application is, during a period of time with a predefined duration, below a predefined maximum number of types, the fourth dynamics criterion being that a variation in the number of calls for services by type and during different predefined time periods is below a threshold, and the fifth dynamics criterion being that a number of call sequences for services is, during a period of time with a predefined duration, below a predefined maximum number of sequences;

the monitoring of the use includes verifying that at least one resource parameter belongs to a respective predefined value interval, each parameter being chosen from among the group consisting of: a memory access number, a quantity of memory used, a dispersion of memory accesses, a CPU execution time, a GPU execution time, a number of used inputs of the platform and a number of used outputs of the platform;

the implementing of at least one monitoring operation includes implementing at least two, preferably at least three, still more preferably each, of the monitoring operations from among the syntactic monitoring, semantic monitoring, monitoring of the dynamics and monitoring of the use; and the implementing of at least one monitoring operation is carried out regularly, during substantially the entire execution duration of the avionics software application by the platform.

The invention also relates to a non-transitory computer-readable medium including a computer program including software instructions which, when executed by a computer, implement a monitoring method as defined above.

The invention also relates to an electronic device for monitoring an avionics software application, able to be executed on a platform including resources and hosting an operating system, the platform being intended to be on board an aircraft, the electronic monitoring device comprising:

a monitoring module configured to implement at least one monitoring operation of the application from among the following four monitoring operations:

syntactic monitoring of each call emitted by the application to the operating system, semantic monitoring of each call emitted by the application to the operating system, monitoring of a dynamic of the calls emitted by the application to the operating system, and monitoring of the use of platform resources by the application;

a generating module configured to generate an alarm signal if an abnormal behavior of the application is detected during the implementation of at least one of said monitoring operations.

The invention also relates to an electronic avionics system comprising:

a memory able to store at least one avionics software application;

a platform able to execute each avionics software application, the platform including resources and hosting an operating system; and an electronic monitoring device for monitoring each avionics software application, the electronic monitoring device being as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
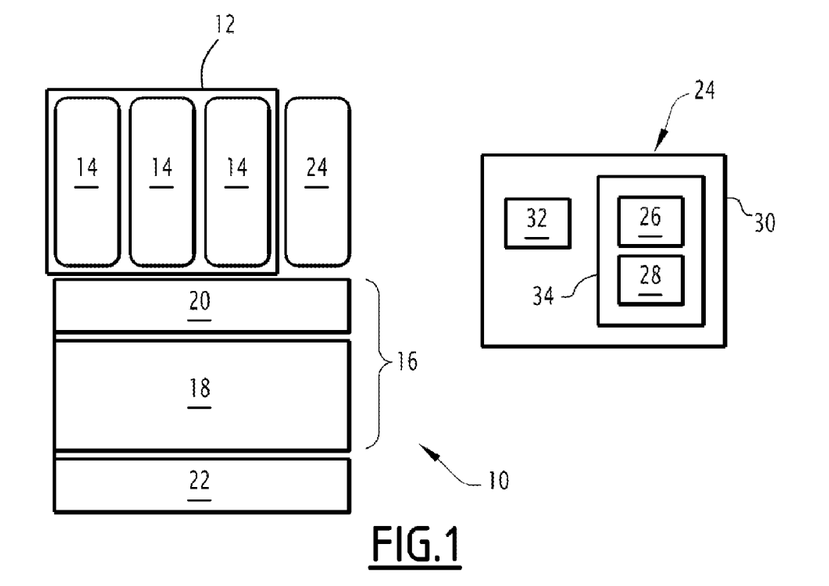
FIG. 1 is a schematic illustration of an electronic avionics system according to the invention, comprising a memory able to store at least one avionics software application; a platform able to execute each avionics software application, the platform including resources and hosting an operating system; and an electronic monitoring device for monitoring each avionics software application.

In FIG. 1, an electronic avionics system 10, intended to be on board an aircraft, comprises a memory 12 able to store at least one avionics software application 14; a platform 16 able to execute each avionics software application 14, the platform 16 including resources 18 and hosting an operating system 20, the platform 16 being connected to other electronic avionics systems 22 of the aircraft.

The electronic avionics system 10 further comprises, according to the invention, an electronic device 24 for monitoring each avionics software application 14.

The aircraft is preferably an airplane. Alternatively, the aircraft is a helicopter, or a drone piloted remotely by a pilot.

In the example of FIG. 1, the memory 12 is able to store three separate avionics software applications 14, and the electronic monitoring device 24 is then configured to monitor each of these avionics software applications 14.

Each avionics software application 14 is intended to be executed by the platform 16 and then designed to emit one or several calls to the operating system 20 hosted by the platform 16 and is also configured to use resources 18 of the platform 16.

Each avionics software application 14 is for example configured to perform two types of processing operations, namely periodic processing operations and aperiodic processing operations.

The periodic processing operations are for example related to the acquisition and processing of received data, such as data coming from sensors of the aircraft, data from processing of other applications, data generated after an action by a pilot of the aircraft. So as not to miss any event, these processing operations must be done periodically. Each periodic processing operation must then be completed before beginning the next acquisition or processing period.

The aperiodic processing operations do not, as their name indicates, depend on a processing or acquisition period, and then must not necessarily be completed before beginning the next acquisition or processing period.

Each avionics software application 14 is also called avionics function. The avionics software applications 14 perform different functions to carry out a flight, and are for example installed on different platforms 16 and use the resources 18 of said platforms 16.

Such functions being critical, like for example the braking system or the flight management system, each avionics software application 14 is preferably monitored regularly by the electronic monitoring device 24, during substantially the entire performance duration of the avionics software application 14 by the platform 16.

The platform 16 is intended to be on board the aircraft. The platform 16 is for example an information processing unit made up of one or several memories associated with one or several processors.

The resources 18 of the platform 16 are physical or logic elements capable of being provided to the avionics software application(s) 14.

The resources 18 are for example distributed in the following categories:
  resources of the data processing type. Such resources are for example the computing power of a processor or the storage capacity of a memory.
  resources of the input and output types.
  resources specific to the avionics network. Such resources are for example the communication routers of an ARINC664 network.
  resources of the graphic type, i.e., resources allowing a display. A monitor is one example of such resources.
  resources of the mass memory type.

For the resources 18, the nominal use can be characterized with registers of the hardware components for the recognition of events, such as number of received Ethernet frames, number of rejected frames, and/or registers of hardware components storing the most recent event(s), such as the execution return address following an interruption.

Each resource 18 has a capacity. The capacity of each resource 18 characterizes the size of said resource 18. For a resource 18 of the input-output type, the capacity of said resource 18 is quantifiable by the number of different inputs and outputs of said resource 18 (for example, the number of discrete, analog, ARINC 429 bus, etc. inputs). For a resource 18 of the data processing type, the capacity of said resource 18 is quantifiable by the computing power of said resource 18 and/or the storage volume of the memory of said resource 18.

The operating system 20 is for example an operating system according to the ARINC 653 standard, or a POSIX operating system, or a hypervisor, or middleware.

One skilled in the art will then understand that the operating system 20 is to be understood broadly, and is more generally a set of at least one system software program, designed to offer services of different types to each application 14.

A service is therefore a function of the system software program usable by the application(s) 14 and reachable by a call, also called call to a service (of the OS) or system call. One example of system software is an ARINC 653 or POSIX OS that provides such services. In the context of the invention, one skilled in the art will understand that it is the notion of call to a service that matters, and not the service as such, offered by the system software.

The services offered by the operating system 20 are known in themselves, and are for example input/output acquisition, process management, communication protocol management, etc. services. The service types are then input/output, process management, communication protocol management, etc. acquisition. One skilled in the art will note that the ARINC 653 and POSIX standards for example each include a list of services generally used in the aeronautic field. One skilled in the art will, however, observe that the invention more generally relates to any system software suitable for an avionics software application 14, as long as the service(s) offered by this system software, as well as the call(s) for service(s) emitted by each avionics software application 14, are identifiable.

The electronic monitoring device 24 is configured to monitor each avionics software application 14 able to be executed on the platform 16, and comprises a monitoring module 26 configured for implementing at least one monitoring operation of the application from among the following four monitoring operations: syntactic monitoring of each call emitted by the application 14 to the operating system 20, semantic monitoring of each call emitted by the application 14 to the operating system 20, monitoring of a dynamic of the calls emitted by the application 14 to the operating system 20 and monitoring of the use by the application 14 of the resources 18 of the platform 16.

The electronic monitoring device 24 also comprises a generating module 28 configured to generate an alarm signal if an abnormal behavior of the application 14 is detected during the implementation of at least one of said monitoring operations by the monitoring module 26.

In the example of FIG. 1, the electronic monitoring device 24 is for example separate from the platform 16, and comprises an information processing unit 30 for example made up of a processor 32 associated with a memory 34.

In an alternative, for which the monitoring device 24 is shown in gray in FIG. 1, the monitoring device 24 is able to be executed directly by the platform 16 and then to use its resources 18. This alternative is a preferred embodiment, and the monitoring device 24 is then preferably further hosted within a specific memory partition of the platform 16, this specific partition in turn being protected from cyber-attacks, for example via one or several access controls and/or integrity protection.

In the example of FIG. 1, whether the monitoring device 24 is separate from the platform 16 or hosted and executed by the platform 16, the monitoring module 26 and the generating module 28 are each made in the form of software, or a software package, executable by a processor, such as the processor 32 when the monitoring device 24 is separate from the platform 16. The memory 34 of the monitoring device 24 is then able to store monitoring software for implementing at least one monitoring operation of the application from among the following four monitoring operations: syntactic monitoring of each call emitted by the application 14 to the operating system 20, semantic monitoring of each call emitted by the application 14 to the operating system 20, monitoring of a dynamic of the calls emitted by the application 14 to the operating system 20, and monitoring of the use by the application 14 of the resources 18 of the platform 16. The memory 34 of the monitoring device 24 is also able to store software for generating an alarm signal if an abnormal behavior of the application 14 is detected during the implementation of at least one of said monitoring operations by the monitoring software. The processor is then able to execute the monitoring software and the generating software.

In an alternative that is not shown, the monitoring module 26 and the generating module 28 are each made in the form of a programmable logic component, such as an FPGA (Field Programmable Gate Array), or in the form of a dedicated integrated circuit, such as an ASIC (Application Specific Integrated Circuit).

When the monitoring device 24 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is a floppy disk, an optical disc, a CD-ROM, a magnetic-optical disc, a ROM memory, a RAM memory, any type of non-volatile memory (for example, EPROM, EEPROM, FLASH, NVRAM), a magnetic card or an optical card. A computer program comprising software instructions is then stored on the readable medium.

The monitoring module 26 is preferably configured to implement the semantic monitoring of each call emitted by the application 14 to the operating system 20.

As an optional addition, the monitoring module 26 is configured to implement at least two, preferably at least three, still more preferably each, of the monitoring operations from among the syntactic monitoring of each call emitted by the application 14 to the operating system 20, semantic monitoring of each call emitted by the application 14 to the operating system 20, monitoring of a dynamic of the calls emitted by the application 14 to the operating system 20 and monitoring of the use by the application 14 of the resources 18 of the platform 16.

In case of at least two separate monitoring operations, the monitoring module 26 is preferably configured to implement the semantic monitoring of each emitted call and the monitoring of a dynamic of the calls emitted by the application 14 to the operating system 20.

In case of at least three separate monitoring operations, the monitoring module 26 is preferably configured to implement the semantic monitoring of each emitted call, the monitoring of a dynamic of the emitted calls and the monitoring of the use by the application 14 of the resources 18 of the platform 16.

The monitoring module 26 is preferably configured to implement the aforementioned monitoring operation(s) regularly, during substantially the entire execution duration of the avionics software application by the platform.

For syntactic monitoring, the monitoring module 26 is configured to verify at least one of first, second and third syntactic criteria. The monitoring module 26 is preferably configured to verify at least two, more preferably at least three, and still more preferably each, from among the first, second and third syntactic criteria.

For the semantic monitoring, the monitoring module 26 is configured to verify that at least one of first, second and third semantic criteria is met by one or more data contained in each call from the application 14 to the operating system 20, also called system call. The monitoring module 26 is preferably configured to verify at least two, still more preferably each, from among the first, second and third semantic criteria.

For monitoring of the dynamic, the monitoring module 26 is configured to verify that at least one of the first, second, third, fourth and fifth dynamics criteria is fulfilled by the application 14. The monitoring module 26 is preferably configured to verify at least two, more preferably at least three, still more preferably at least four, and even more preferably each, from among the first, second, third, fourth and fifth dynamics criteria.

These syntactic, respectively semantic, respectively dynamics criteria will be described in more detail later, in the section relative to the description of the operation of the monitoring device 24 according to the invention.

For monitoring of the use, the monitoring module 26 is configured to verify that at least one resource parameter belongs to a respective predefined value interval, each parameter being chosen from among the group consisting of: a memory access number, a quantity of memory used, a dispersion of memory accesses, a CPU execution time, a GPU execution time, a number of used inputs of the platform and a number of used outputs of the platform.

The generating module 28 is configured to generate an alarm signal if an abnormal behavior of the monitored application 14 is detected during the implementation of at least one of said aforementioned monitoring operations.

Abnormal behavior means that at least one of the criteria being monitored, i.e., taken into account, from among the criteria defined above and for the monitoring operation(s) implemented by the monitoring module 26, is not fulfilled, i.e., is not verified.

One skilled in the art will then note that the identification of an abnormal behavior of a monitored application 14 is done by comparison with the predefined usage domain of the application, also called predefined cyber usage domain, this domain corresponding to the limits of the different syntactic, semantic and dynamics criteria, as defined above, as well as, if applicable, the verification of the resource parameter(s) for monitoring the use.

This comparison is generally a comparison with predefined thresholds, and one skilled in the art will nevertheless observe that alternatively, other methods are used depending on the monitoring operation(s) done, for example with verifications of mathematical or logic equations from measured and/or predetermined data.

Figure 2:
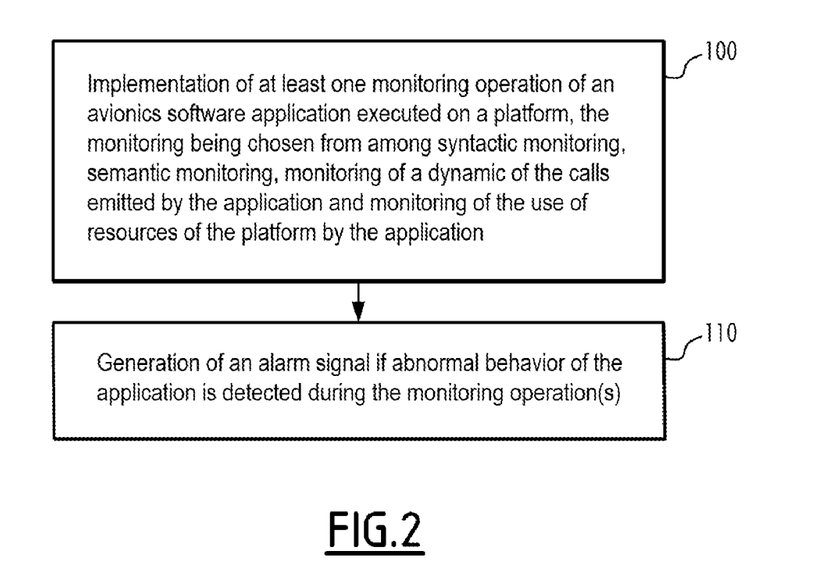
FIG. 2 is a flowchart of a method, according to the invention, for monitoring an avionics software application able to be executed on the platform, the method being implemented by the monitoring device of FIG. 1.

The operation of the monitoring device 24 according to the invention will now be explained using FIG. 2, showing a flowchart of the method, according to the invention, for monitoring an avionics software application 14 able to be executed on the platform 16, the method being implemented by the electronic monitoring device 24.

One skilled in the art will first see that the different monitoring operations and associated criteria, as defined above, are defined during a preliminary design phase or during a mission preparation phase, before implementing the monitoring method according to the invention. This definition of the monitoring operations and associated criteria is further preferably done prior to flight of the aircraft, the monitoring method according to the invention preferably being implemented during the flight of the aircraft.

During a step 100, the monitoring device 24 implements, via its monitoring module 26, at least one monitoring operation of the application 14 from among the following four monitoring operations:
  syntactic monitoring of each call emitted by the application to the operating system,
  semantic monitoring of each call emitted by the application to the operating system,
  monitoring of a dynamic of the calls emitted by the application to the operating system, and
  monitoring of the use of platform resources by the application.

During this monitoring step 100, the monitoring module 26 preferably implements at least two, preferably at least three, still more preferably each, of the monitoring operations from among the syntactic monitoring, semantic monitoring, monitoring of the dynamics and monitoring of the use.

This step 100 for implementing the monitoring operation(s) is preferably carried out regularly, during substantially the entire execution duration of the avionics software application 14 by the platform 16.

The syntactic monitoring includes verifying at least one of first, second and third syntactic criteria.

The syntactic monitoring preferably includes verifying at least two, more preferably at least three, and still more preferably each, from among the first, second and third syntactic criteria.

The first syntactic criterion is the belonging of each call, emitted by the considered application 14 to the operating system 20, to a list of authorized calls to the operating system 20.

The second syntactic criterion is the compliance of the series of calls, emitted by the considered application 14 to the operating system 20, with authorized call sequences.

The third syntactic criterion is the compliance of each datum relative to a predefined corresponding format. For the third syntactic criterion, the monitoring module 26 for example verifies the compliance of a predefined grammar or the belonging of a field to a predefined list of fields. In computer language, the grammar refers to a set of predefined rules that must be respected between fields, and the fields are for example fields of a message, fields of a database.

The semantic monitoring includes verifying that at least one of first, second and third semantic criteria is met by one or more data contained in each call from the application 14 to the operating system 20.

The semantic monitoring preferably includes verifying at least two, and more preferably each, from among the first, second and third semantic criteria.

The first semantic criterion is the belonging to a predefined interval of values of the update time frame for each datum. The predefined interval of values for the first semantic criterion is for example related to each period of the periodic processing operation(s) done by the application 14. The main intervals are obtained by a prior measurement of the periodicity of the processing operation(s). The predefined interval of values for the first semantic criterion is for example the interval of values equal to within plus or minus 10% of the previously measured period. For example, to monitor a given application using 3 first data refreshed every 50 ms and 2 second data refreshed every 100 ms, the predefined interval of values associated with the processing of the first values will be comprised between 45 ms and 55 ms, and that associated with the processing of the second values will be comprised between 90 ms and 110 ms.

The second semantic criterion is a coherence criterion for at least one predefined datum, such as a position or a speed of the aircraft.

The third semantic criterion is a coherence criterion between at least two predefined data, such as the position or the speed of the aircraft.

When a datum is governed by a physical law or when data are connected to one another by a physical law, then the coherence criterion associated with these second and third semantic criteria is the compliance with said physical law. For example, the speed and the position of the second and third semantic criteria of an object, such as the aircraft, are connected by a well-known physical law, and the deviation between two successive positions, relative to the time, must then be consistent with the speed.

When data are connected to one another by their format, type or structure, then the coherence criterion associated with these second and third semantic criteria aims to verify this coherence of format, type or structure. For example, the sum of the lengths of the data of a message may not exceed the length of the message that contains them.

Alternatively or additionally, the second and third semantic criteria are based on an algorithm for verifying a new set of data relative to a prior set of data, according to a predefined law.

The monitoring of the dynamics includes verifying that at least one of first, second, third, fourth and fifth dynamics criteria is met by the application.

The monitoring of the dynamics preferably includes verifying at least two, more preferably at least three, still more preferably at least four, and even more preferably each, from among the first, second, third, fourth and fifth dynamics criteria.

The first dynamics criterion is that the number of services of the operating system 20 required by the application 14 being monitored is, during a period of time with a predefined duration, below a predefined maximum number of services per unit of time. In the following examples, in an ARINC 653 context, an application 14 uses many services, part of which is monitored. Below are examples:

Example 1

A single monitored service: the predefined threshold is 10 calls during a time period of 50 ms, for calls to the service READ_SAMPLING_MESSAGE.

Example 2

Several monitored calls: the predefined maximum number of services per unit of time is 20 services every 200 ms requested from among the list of 5 services, such as READ SAMPLING MESSAGE, WRITE SAMPLING MESSAGE, SET EVENT, WAIT EVENT, SUSPEND.

The second dynamics criterion is that a number of errors on the services is, during a period of time with a predefined duration, below a predefined maximum number of errors. As an example, the predefined maximum number of errors is equal to 0 when the platform 16 is a platform having a critical security level, i.e., the maximum security level. For a platform 16 having a lower security level, the predefined maximum number of errors is for example equal to 2 errors every 500 ms.

The third dynamics criterion is that the number of different types of services required by the application is, during a period of time with a predefined duration, below a predefined maximum number of types. The predefined maximum number of types for the third dynamics criterion for example depends on the type of processing operations requested by the considered avionics application 14, namely periodic and aperiodic. For periodic processing, the possible actions resulting from a modification of an input are limited and known. For aperiodic processing operations, processing operations are for example grouped together: during a download request, the number of record requests in a flash sector and CRC computations on this sector is known and bounded. Furthermore, a request made in an isolated manner relative to said processing operations is preferably forbidden, of course with the exception of the first request in a group of requests, which is isolated by definition, since it is the first request in the group.

The fourth dynamics criterion is that a variation in the number of calls for services by type and during different predefined time periods is below a threshold. For example, for a periodic processing operation (which is inherently not highly variable), the threshold is equal to 5 types of services (different types of calls) every 50 ms. The application 14 preferably also has the right to change a type of services between 2 successive periods. Upon each emitted sample, the emitted sample is then preferably compared to the previous emitted samples in light of a trade rule for verifying the datum relative to the previous samples. For example, the deviation is greater than a minimum value and/or less than a maximum value, and/or the new value is at most a standard deviation of the previous value.

The fifth dynamics criterion is that a number of call sequences for services is, during a period of time with a predefined duration, below a predefined maximum number of sequences. A value of the predefined maximum number of sequences for the fifth dynamics criterion is, for example, defined from an analysis of the requested periodic and aperiodic processing operations and/or learning. A sequence of calls is a series of calls that may be repeated several times over time, and then defines a pattern. The predefined maximum number of sequences is for example equal to 10.

Alternatively or additionally, the monitoring of the dynamics is implemented by encoding, using a single identifier, each call of the avionics software application 14 to the operating system 20, and using the Lempel-Ziv-Welch algorithm to compress all of the calls to the operating system 20 made by said application 14. The deeper the dictionary of data built by the algorithm is, the richer the diversity of the call sequences made is. The couplet made up of the number of calls and depth of the dictionary then becomes a parameter of the "usage domain", making it possible to monitor the evolution of the avionics software application 14 over time.

The monitoring of the use includes verifying that at least one resource parameter belongs to a respective predefined value interval, each parameter being chosen from among the group consisting of: a memory access number, a quantity of memory used, a dispersion of memory accesses, a CPU execution time, a GPU execution time, a number of inputs of the platform used and a number of outputs of the platform used.

To monitor the use, the predefined interval of values associated with the quantity of memory used is for example comprised between 1 MB and 3 MB, preferably with a maximum value substantially equal to 2.5 MB. The predefined interval of values associated with the dispersion of memory accesses is for example comprised between 3 MB and 5 MB, preferably with a maximum value substantially equal to 4 MB. The predefined interval of values associated with this CPU execution time is for example comprised between 4 and 6 ms.

During a following step 110, the monitoring device 24 generates, via its generating module 28, an alarm signal if an abnormal behavior of the application 14 is detected during the implementation of said monitoring operations during the previous step 100.

One skilled in the art will note that, in the above, the adjective "predefined" must not be interpreted restrictively as meaning "fixed" or "invariable". "Predefined" then means defined before a considered step, the considered step here being the step 100 for monitoring the avionics software application(s) 14. In other words, when the adjective "predefined" is associated with a given object, such as a threshold, a duration, an interval of values, a maximum number, this means that this object is defined, i.e., determined, initially or for example determined by learning before the actual monitoring of the considered application, i.e., before the step 110.

Thus, the monitoring method according to the invention makes it possible to implement at least one, preferably at least two, more preferably at least three, and still more preferably each, of the monitoring operations from among the syntactic monitoring, semantic monitoring, monitoring of the dynamics and monitoring of the use allows a precise definition, i.e., characterization of a usage domain of the application, also called cyber usage domain; then to generate an alarm once an abnormal behavior of the software application(s) 14 be monitored is detected, i.e., once at least one of the software applications 14 being monitored leaves its characterized usage domain.

The monitoring method according to the invention then allows in-depth protection of the application, as opposed to a peripheral protection, through monitoring of the avionics network, of the state of the art. In other words, the monitoring method according to the invention does not contribute to the ability to block the intrusion, but significantly enhances the ability to subsequently prevent it from causing harm.

Furthermore, the monitoring method according to the invention, knowing the "normal" operation of the software application(s) 14 being monitored, makes it possible to detect a cyber-attack much earlier than a method of the state of the art would do.

The monitoring preferably implemented by the monitoring module 26 is the semantic monitoring of each call emitted by the application 14 to the operating system 20, and it in particular makes it possible to detect a malevolent code, or software function, trying to alter the integrity of data within the avionics software application 14.

The monitoring next preferably implemented by the monitoring module 26 is the monitoring of a dynamic of the calls emitted by the application 14 to the operating system 20, and it in particular makes it possible to detect a denial of service of at least part of the avionics software application 14.

The monitoring next preferably implemented by the monitoring module 26 is the monitoring of the use by the application 14 of the resources 18 of the platform 16, and it in particular makes it possible to detect a malevolent code, or software function, misappropriating the hardware resources of the platform 16.

Lastly, the syntactic monitoring of each call emitted by the application 14 to the operating system 20 in particular makes it possible to detect a malevolent code, or software function, inserted into the avionics software application 14 and making unexpected calls to the operating system 20.

The monitoring module 26 is preferably configured to carry out the aforementioned monitoring operation(s) regularly, during substantially the entire execution duration of the avionics software application by the platform.

One can thus see that the method and the monitoring device 24 according to the invention allow more effective detection of an attack targeting the software application(s) 14 being monitored.

The invention claimed is:

1. An electronic device for monitoring an avionics software application, able to be executed on a platform including resources and hosting an operating system, the platform being configured to be on board an aircraft, the electronic monitoring device comprising:
- a monitoring module configured to implement at least three monitoring operations of the application from among the following four monitoring operations:
  - syntactic monitoring of each call emitted by the application to the operating system,
  - semantic monitoring of each call emitted by the application to the operating system,
  - monitoring of a dynamic of the calls emitted by the application to the operating system, and
  - monitoring of the use of platform resources by the application; and
- a generating module configured to generate an alarm signal when an abnormal behavior of the application is detected during the implementation of at least one of said monitoring operations,
- wherein the semantic monitoring includes verifying that at least one of first, second, and third semantic criteria is met by one or more data contained in each call from the application to the operating system,
- the first semantic criterion being the belonging to a predefined interval of values of the update time frame for each datum,
- the second semantic criterion being a coherence criterion for at least one predefined datum,
- the third semantic criterion being a coherence criterion between at least two predefined data,
- the one or more data contained in each of the calls is selected from the group consisting of data coming from sensors of the aircraft, data from processing of other applications other than the avionics software application, and data generated after an action by a pilot of the aircraft, and
- each of the monitored calls is a call to a service that is a function of the operating system usable by the monitored software application.

2. An electronic avionics system, comprising:
- a memory configured to store at least one avionics software application;
- a platform configured to execute each of the avionics software application, the platform including resources and hosting an operating system; and
- the electronic monitoring device according to claim 1 that is configured to monitor each of the avionics software application.

3. A method for monitoring an avionics software application, able to be executed on a platform including resources and hosting an operating system, the platform being configured to be on board an aircraft, the method being implemented by an electronic monitoring device and comprising:
- implementing at least one monitoring operation of the application from among the following four monitoring operations:
  - syntactic monitoring of each call emitted by the application to the operating system,
  - semantic monitoring of each call emitted by the application to the operating system,
  - monitoring of a dynamic of the calls emitted by the application to the operating system, and
  - monitoring of the use of platform resources by the application; and
- generating an alarm signal when an abnormal behavior of the application is detected during the implementation of at least one of said monitoring operations,
- wherein the implementing necessarily includes the semantic monitoring of each call emitted by the application to the operating system,
- wherein the semantic monitoring includes verifying that at least one of first, second, and third semantic criteria is met by one or more data contained in each call from the application to the operating system,
- the first semantic criterion being the belonging to a predefined interval of values of the update time frame for each datum,
- the second semantic criterion being a coherence criterion for at least one predefined datum,
- the third semantic criterion being a coherence criterion between at least two predefined data,
- the one or more data contained in each of the calls is selected from the group consisting of data coming from sensors of the aircraft, data from processing of other applications other than the avionics software application, and data generated after an action by a pilot of the aircraft, and
- each of the monitored calls is a call to a service that is a function of the operating system usable by the monitored software application.

4. The method according to claim 3, wherein the syntactic monitoring includes verifying at least one of first, second, and third syntactic criteria,
- the first syntactic criterion being the belonging of each emitted call to a list of authorized calls to the operating system,
- the second syntactic criterion being the compliance of the series of calls with authorized call sequences, and
- the third syntactic criterion being the compliance of each datum relative to a predefined corresponding format.

5. The method according to claim 3, wherein the semantic monitoring includes verifying that at least one of first, second, and third semantic criteria is met by one or more data contained in each call from the application to the operating system,
- the first semantic criterion being the belonging to a predefined interval of values of the update time frame for each datum,
- the second semantic criterion being a coherence criterion for at least one predefined datum, and
- the third semantic criterion being a coherence criterion between at least two predefined data.

6. The method according to claim 3, wherein the operating system is configured to offer a plurality of services, of different types, to the application, and
- wherein the monitoring of the dynamics includes verifying that at least one of first, second, third, fourth and fifth dynamics criteria is met by the application,
- the first dynamics criterion being that the number of services required by the application is, during a period of time with a predefined duration, below a predefined maximum number of services per unit of time,
- the second dynamics criterion being that a number of errors on the services is, during a period of time with a predefined duration, below a predefined maximum number of errors,
- the third dynamics criterion being that the number of different types of services required by the application is, during a period of time with a predefined duration, below a predefined maximum number of types,
- the fourth dynamics criterion being that a variation in the number of calls for services by type and during different predefined time periods is below a threshold, and the fifth dynamics criterion being that a number of call sequences for services is, during a period of time with a predefined duration, below a predefined maximum number of sequences.

7. The method according to claim 3, wherein the monitoring of the use includes verifying that at least one resource parameter belongs to a respective predefined value interval, each parameter being chosen from among the group consisting of: a memory access number, a quantity of memory used, a dispersion of memory accesses, a CPU execution time, a GPU execution time, a number of used inputs of the platform, and a number of used outputs of the platform.

8. The method according to claim 3, wherein the implementing of at least three monitoring operations includes implementing each of the monitoring operations from among the syntactic monitoring, semantic monitoring, monitoring of the dynamics, and monitoring of the use.

9. The method according to claim 3, wherein the implementing of at least three monitoring operations is carried out regularly, during substantially the entire execution duration of the avionics software application by the platform.

10. A non-transitory computer-readable medium including a computer program comprising software instructions which, when executed by a computer, implement the method according to claim 3.

* * * * *